United States Patent [19]

Woodard

[11] Patent Number: 4,801,087
[45] Date of Patent: Jan. 31, 1989

[54] EXHAUST NOZZLE FOR A GAS TURBINE ENGINE

[75] Inventor: Clifford S. Woodard, Bristol, England

[73] Assignee: Rolls-Royce plc, England

[21] Appl. No.: 5,108

[22] Filed: Jan. 20, 1987

[30] Foreign Application Priority Data

Jan. 23, 1986 [GB] United Kingdom ............... 8601675

[51] Int. Cl.⁴ ............................................. F02K 1/12
[52] U.S. Cl. ........................ 239/127.1; 239/265.19; 239/265.39; 60/230; 60/266
[58] Field of Search .................. 239/265.19, 265.33, 239/265.35, 265.37, 265.39, 265.41, 127.1, 127.2; 60/228, 230, 232, 266; 431/158

[56] References Cited

U.S. PATENT DOCUMENTS

| | | | |
|---|---|---|---|
| 2,799,989 | 7/1957 | Kappus | 239/265.35 |
| 2,831,321 | 4/1958 | Laucher | 239/265.39 |
| 3,374,954 | 3/1968 | Card | 239/127.1 |
| 4,375,276 | 3/1983 | Konarski | 60/232 |
| 4,605,169 | 8/1986 | Mayers | 239/265.41 |
| 4,641,782 | 2/1987 | Woodward | 239/265.35 |

*Primary Examiner*—Andres Kashnikow
*Assistant Examiner*—Chris Trainor
*Attorney, Agent, or Firm*—Parkhurst, Oliff & Berridge

[57] ABSTRACT

An exhaust nozzle for a gas turbine engine comprises a substantially tubular duct structure to which is mounted flow directing flaps for varying the throat area of the nozzle. The duct structure is progressively shaped and deformed as it extends in a downstream direction to provide straight upper and lower lips to which respective upper and lower flaps are pivotally attached for selectively vectoring the exhaust flow. The opposing sidewalls extend vertically within the duct structure and protrude therefrom between which the flaps and exhaust orifice is thereby defined within an essentially tubular duct.

9 Claims, 3 Drawing Sheets

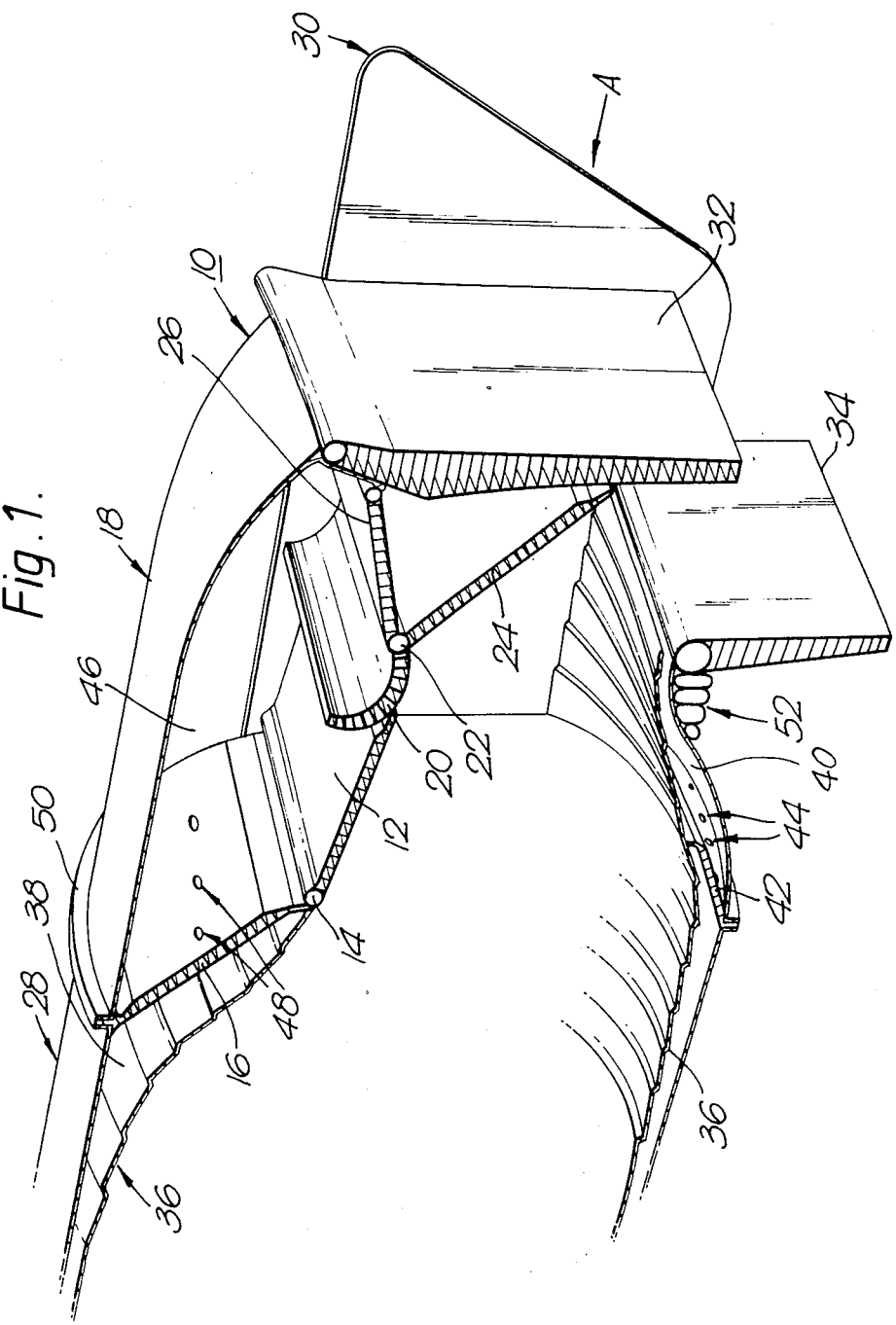

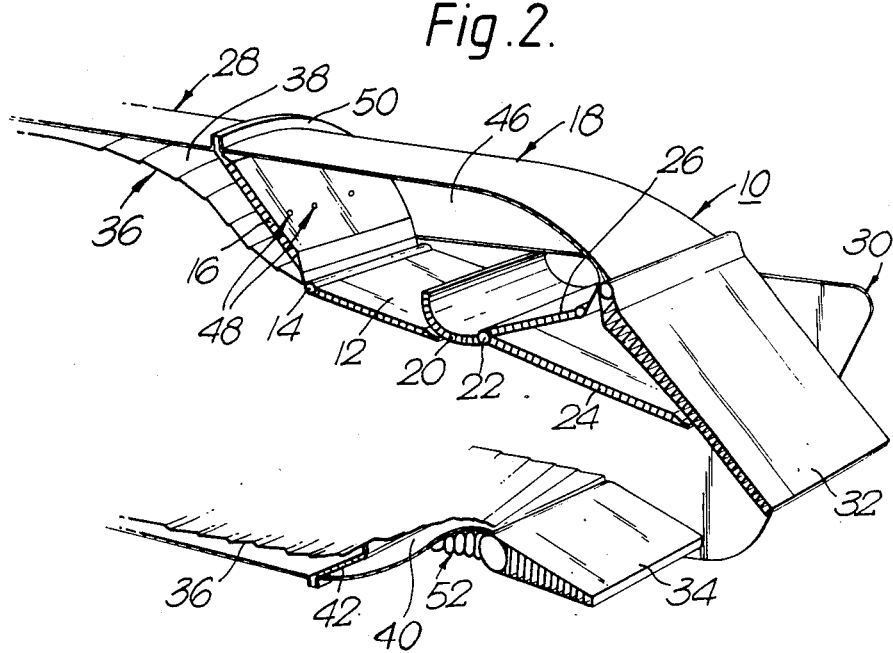
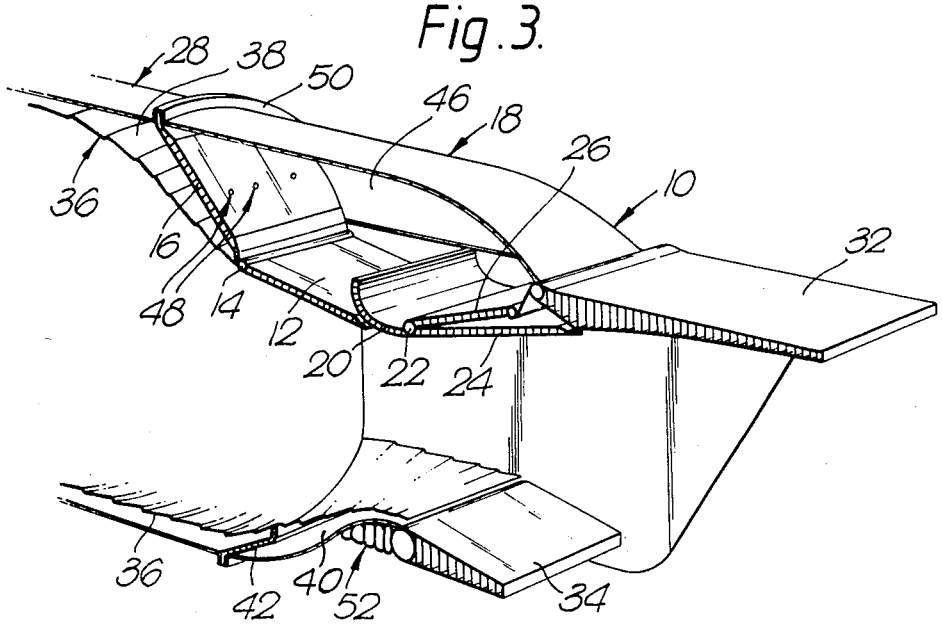

EXHAUST NOZZLE FOR A GAS TURBINE ENGINE

BACKGROUND OF THE INVENTION

This invention relates to an exhaust nozzle for a gas turbine engine. The invention has particular application in the field of variable area vectorable nozzles which have a rectangular flow path and outlet orifice.

Any exhaust nozzle which has a rectangular outlet orifice must be strong enough for the orifice shape to be maintained despite the loads exerted on it by the exhaust gases flowing through the nozzle. Many current designs either have to be very heavy in order to have the strength to maintain the rectangular shape, or suffer a loss of performance due to distortion of the outlet orifice. These problems are compounded when the nozzle is of variable outlet area and has flaps or cowls for vectoring the exhaust gases.

SUMMARY OF THE INVENTION

The invention as claimed provides a vectorable nozzle having a rectangular outlet orifice which is sufficiently stiff to maintain the shape of the outlet orifice without significant weight penalty.

The invention has particular advantage when used with a variable area vectorable nozzle, whether of convergent or convergent/divergent flow path.

BRIEF DESCRIPTION OF THE DRAWINGS

The invention will now be described by way of an example with reference to the accompanying drawings in which FIGS. 1 to 4 show cut-away pictorial views of a nozzle according to the present invention and FIG. 5 is a view in the direction of arrow A in FIG. 1.

DETAILED DESCRIPTION OF THE INVENTION

Figure 4:
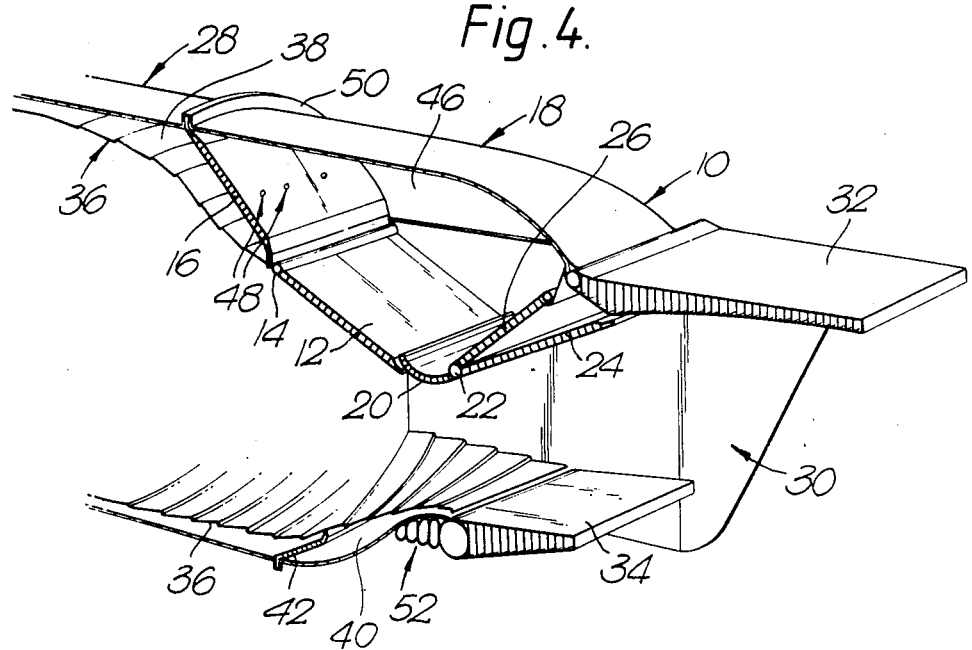

Referring to FIGS. 1 to 4, there is shown a variable area convergent/divergent vectorable nozzle 10 mounted on a jet pipe 28 adapted to receive hot exhaust gases from a gas turbine engine (not shown). The nozzle 10 comprises a series of flow-directing flaps including a primary upper flap 12 which is mounted at its upstream end on a hinge structure 14. The resultant loads on the flap 12 due to gas pressure are reacted through a supporting member 16 which is rigidly attached to a circular duct structure 18. Adjacent and downstream of the primary upper flap 12 there is a curved flap 20 of arc section. The curved flap 20 is pivotal about its downstream end by virtue of a second hinge structure 22 on which the curved flap 20 is mounted. The second hinge structure 22 also supports a downstream upper flap 24 which extends away from the second hinge structure 22 in a downstream direction. The gas loads exerted on the flaps 20 and 24 are carried through a second supporting member 26 which is pivotally attached to the duct structure 18.

The nozzle 10 terminates in a rectangular outlet orifice defined by two opposing sidewalls 30 extending along and within the duct structure (only one of which is shown), and an upper and lower ventral flap. The upper ventral flap 32 is pivotally mounted at its upstream end to the duct structure 18. Similarly, the lower ventral flap 34 is pivotally mounted at its upstream end to the duct structure 18.

The nozzle 10 further comprises a heat shield liner 36 located within the nozzle 10 and the jet pipe 28. Within the jet pipe 28 the heat shield liner extends circumferentially to form a pipe which is radially spaced from the jet pipe 28 thereby defining an annular upstream chamber 38. Within the nozzle 10 the heat shield liner 36 is arranged to extend along the lower part as far as the lower ventral flap 34 thereby defining a further downstream chamber 40.

The upstream chamber 38 is fed with cooling air from the gas turbine engine, a proportion of which cools the radially inner surface of the liner 36 by passing through small orifices (not shown), formed in the liner. The downstream chamber 40 is fed with cooling air from the upstream chamber 38 by way of a plurality of apertures 44 in a heat shield liner supporting member 42. Due to the exhaust gases decreasing in pressure as they increase in velocity while passing through the nozzle 10, the downstream chamber 40 is at a lower pressure than the upstream chamber 38. The cooling air in the downstream chamber 40 passes through further orifices (not shown) in the heat shield liner 36 and the lower ventral flap 34. A further upper chamber 46 is also provided not only to provide cooling to the flow directing flaps but also to exert a degree of pressure balancing in order to reduce actuation loads on those flaps. The upper chamber 46 is defined by the duct structure 18, the supporting member 16, the sidewalls 30 and the flaps 12 and 20. Some cooling air may also pass through apertures formed in the second supporting member 26 to cool the flap 20 and thence flow through a small gap between the flap 20 and the upper ventral flap 32.

Figure 5:
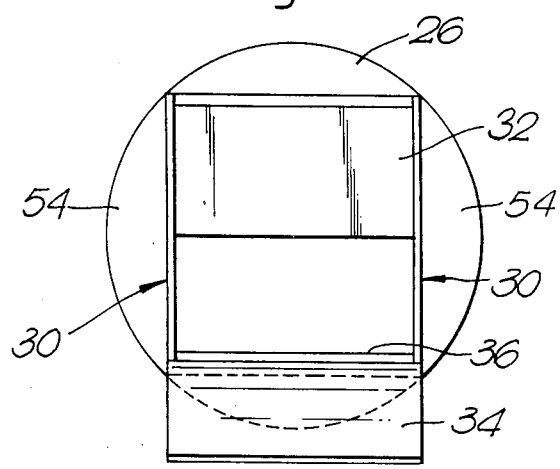

Referring to FIG. 5 the duct structure 18 is of near tubular section which allows the forces exerted on the various flow directing flaps to be reacted through it without the need for a large number of strengthening ribs. The duct structure 18 is of circular section at the flanged joint 50 (shown in FIGS. 1 to 4) where it is fastened to the jet pipe 28. As the duct structure 18 extends in a downstream direction the upper and lower portions of the duct structure 18 are flattened to provide for the fitting of the upper and lower ventral flaps 32, 34. The flattened parts of the duct structure, together with two sideplates 30, form a rectangular shaped orifice. A blanking plate 54 is provided between each sideplate 30 and the adjacent side portion of the duct structure 18. A very rigid nozzle is therefore formed from a substantially tubular duct although the nozzle has a rectangular flow path and outlet orifice. It is envisaged that a small number of strengthening ribs 52 may be required where the duct structure 18 is subject to extreme flattening such as where the lower ventral flap 34 joins the duct structure 18.

In operation, the flow directing flaps 12, 20, 24, 32, and 34 are all movable about their respective pivots by actuation means not shown, but well known in the art. The second supporting member 26 is also movable. By selectively positioning the flow directing flaps 12, 20 and 24 the exhaust flow through the nozzle can be optimized for maximum efficiency. FIG. 3 shows the flow directing flaps 12, 20 and 24 in a maximum throat area position which would be adopted for maximum flow and therefore maximum power. FIG. 4 shows the flow directing flaps 12, 20 and 24 in a minimum flow area position associated with maximum efficiency. FIGS. 1 and 2 depict the upper and lower ventral flaps 32, 34 being used to direct the exhaust flow through the nozzle in a downward direction in order to produce lift on the aircraft in which the nozzle is installed.

For optimum efficiency, a plurality of wiping seals may be incorporated into the nozzle to reduce gas leakage. Specifically, the wiping seals may be fitted between the sides of the upper and lower ventral flaps 32, 34 and the opposing sidewalls 30. Also, the flow directing flaps 12, 20 and 24 may also be provided with wiping seals in a similar manner.

I claim:

1. An exhaust nozzle for a gas turbine engine comprising:
   duct structure, generally circular in cross-section, having upstream and downstream ends, the downstream end of the duct structure being shaped and formed to provide generally straight lower and upper lips each adapted to form attachment means for flap means; upper and lower ventral flap means movably mounted to the attachment means; and two opposing side planar along their entire lengths, walls, planar along their entire lengths, each positioned and arranged to extend along and within the generally circular duct structure and protrude therefrom in a downstream direction wherein the upper and lower flap means extend between the opposing sidewalls to define a rectangular flow path through the nozzle.

2. An exhaust nozzle as claimed in claim 1 wherein the nozzle further comprises further flap structure adapted to define in at least one position a variable area flow path through the nozzle.

3. An exhaust nozzle as claimed in claim 2 wherein the further flap structure comprises a primary upper flap pivotally mounted at its upstream end to supporting structure which is attached to the duct structure, a curved flap of substantially arc section arranged adjacent to, and extending downstream from, the primary upper flap, the curved flap being mounted at a downstream end to a hinge structure which is itself supported by a second supporting member pivotally attached to the duct structure, and a downstream upper flap pivotally mounted to a downstream end to the said hinge structure.

4. An exhaust nozzle as claimed in claim 1 wherein the upper ventral flap is pivotally attached at a downstream end to the upper lip of the duct structure and the opposing lower ventral flap is pivotally attached at a downstream end to the lower lip of the duct structure, both ventral flaps being positioned and arranged in relation to the sidewalls to form a rectangular outlet orifice.

5. An exhaust nozzle as claimed in claim 4 wherein each ventral flap is movable about a respective pivotal axis to direct selectively an exhaust flow of gas from a rearward direction to a downward direction.

6. An exhaust nozzle as claimed in claim 1 wherein a liner is provided within the duct structure to insulate at least a portion of the duct structure from hot exhaust gases passing through the nozzle.

7. An exhaust nozzle as claimed in claim 6, wherein the liner is spaced from the duct structure to define at least one chamber into which cooling air is passed, the liner being provided with at least one hole through which the cooling air may pass.

8. An exhaust nozzle as claimed in claim 2 wherein the further flap structure together with the duct structure and the sidewalls are all positioned and arranged with respect to each other to form a chamber into which cooling air is fed.

9. An exhaust nozzle as claimed in claims 1 wherein each sidewall has attached to it a blanking plate extending from the respective sidewall to adjacent duct structure to form a gas tight seal therewith.

* * * * *

UNITED STATES PATENT AND TRADEMARK OFFICE
CERTIFICATE OF CORRECTION

PATENT NO. : 4,801,087
DATED : January 31, 1989
INVENTOR(S) : Clifford S. WOODWARD It is certified that error appears in the above-identified patent and that said Letters Patent is hereby corrected as shown below:

Column 3, line 18, delete "planar along their entire lengths";

Column 4, line 32, change "claims" to --claim--.

Signed and Sealed this

Fifth Day of December, 1989

Attest:

JEFFREY M. SAMUELS

Attesting Officer     Acting Commissioner of Patents and Trademarks